Jan. 23, 1923.　　　　　　　　　　　　　　　　　　　　1,443,068
E. J. CONLEY ET AL.
MACHINE FOR COVERING PACKAGES WITH FOIL AND SEALING SAID FOIL.
FILED MAY 12, 1921.　　　　　　　　　　7 SHEETS-SHEET 1
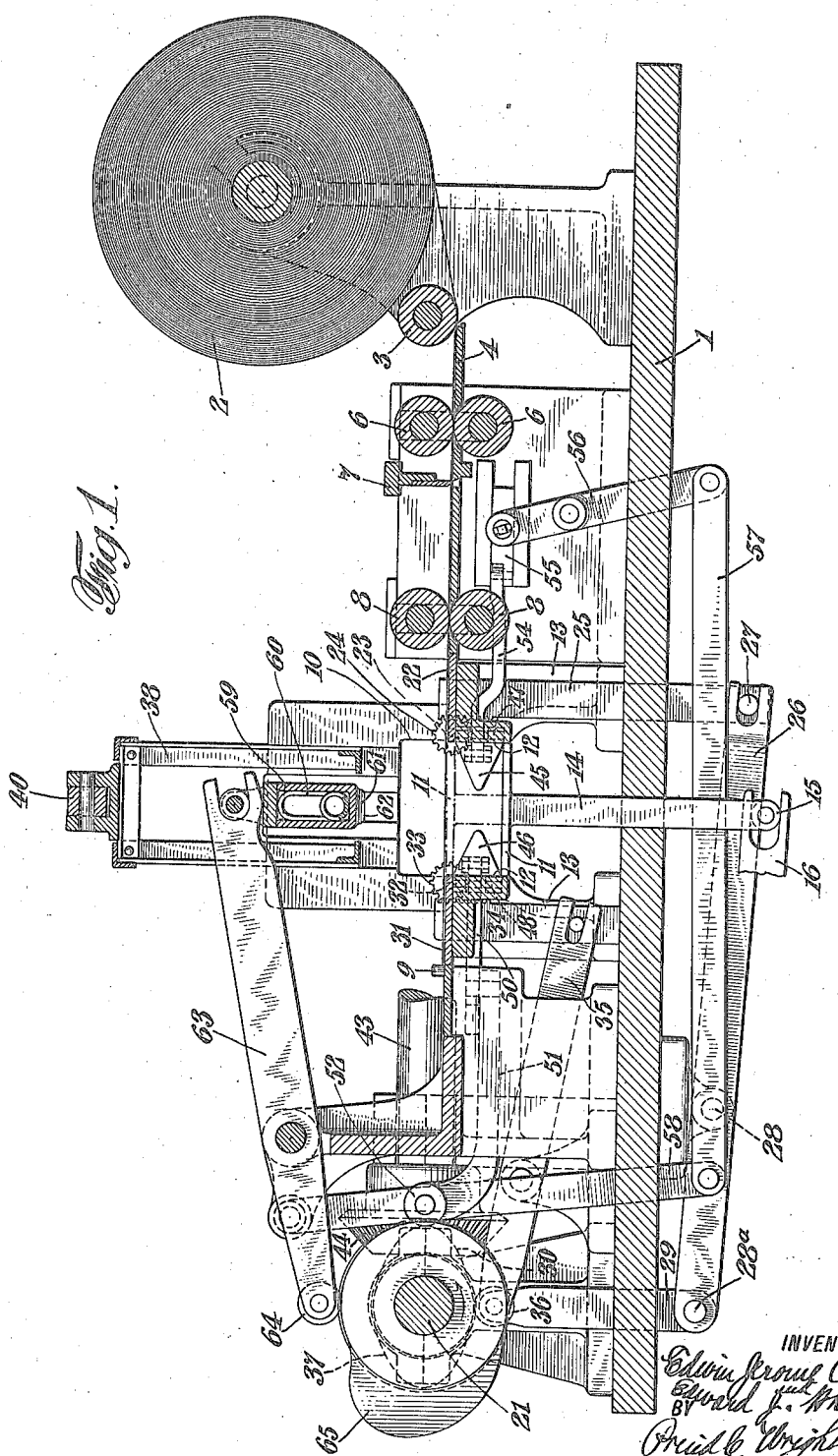

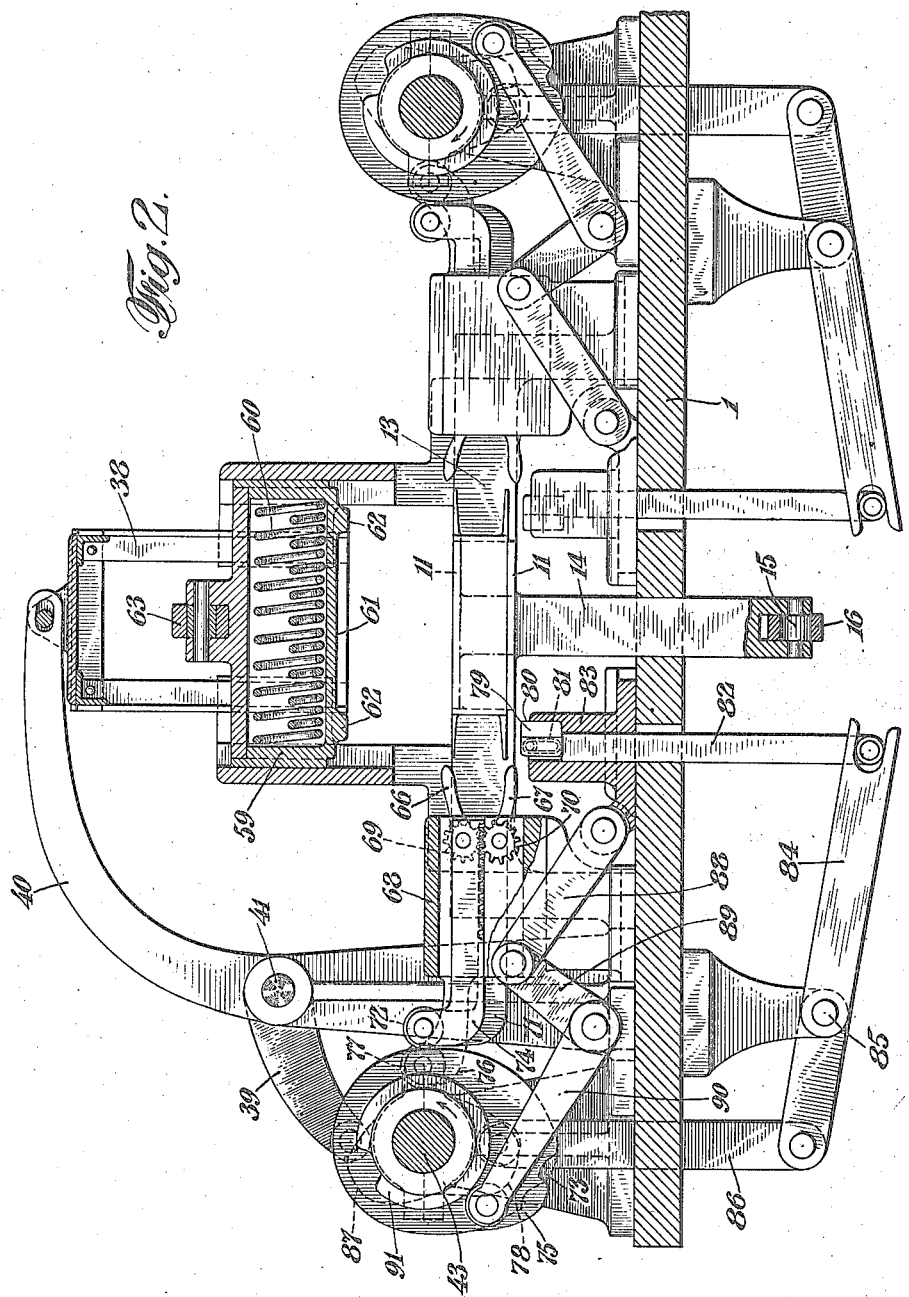

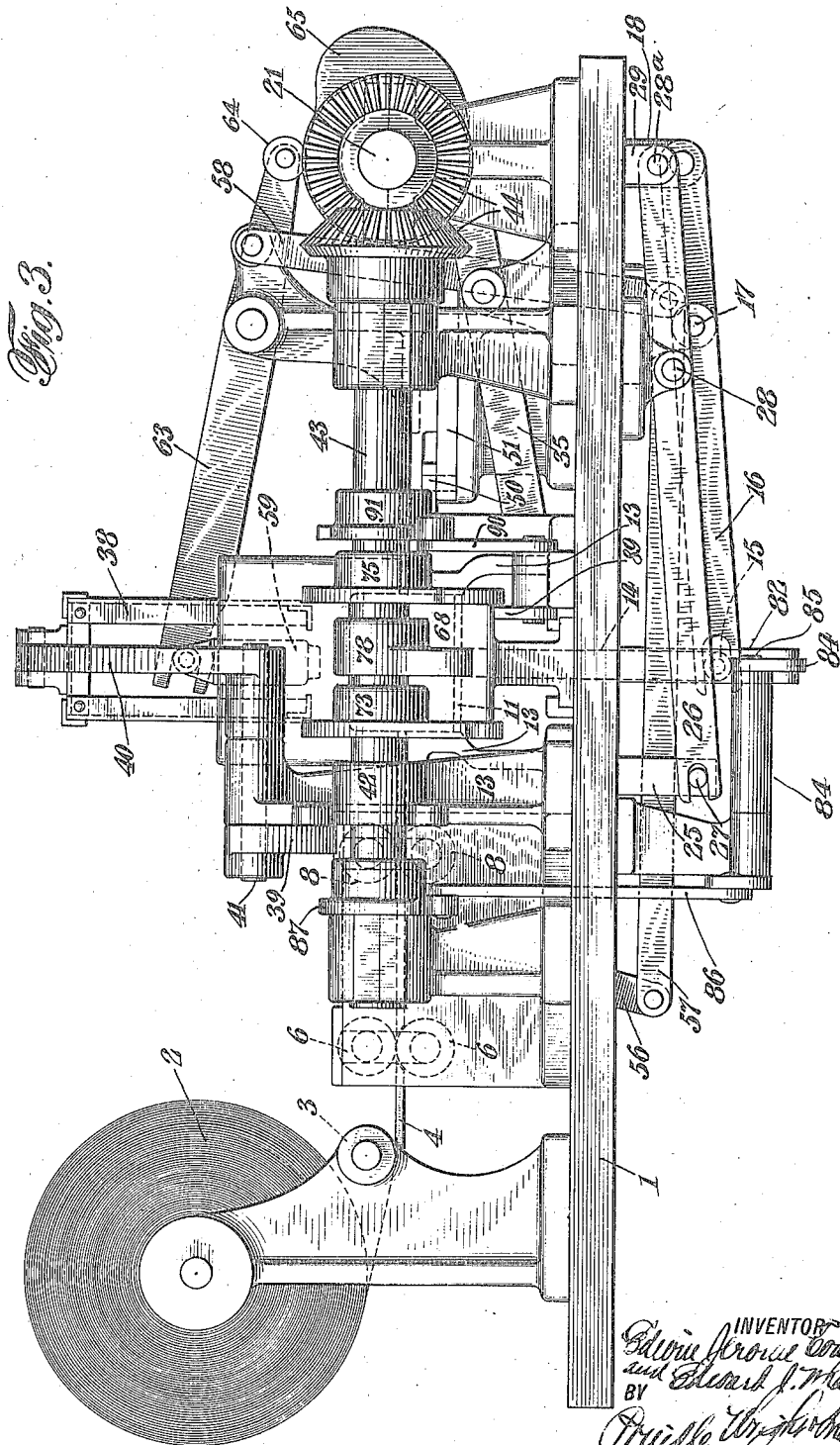

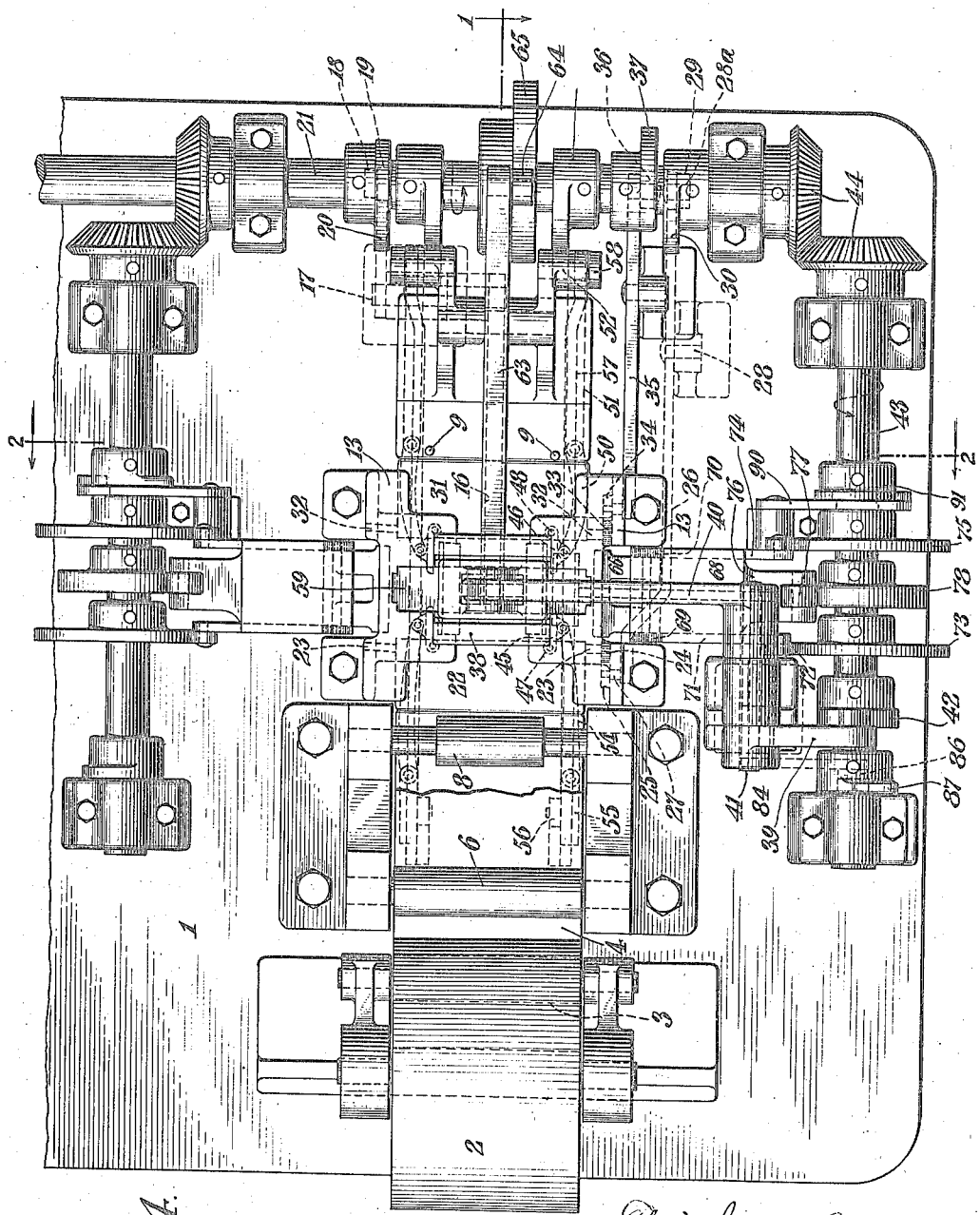

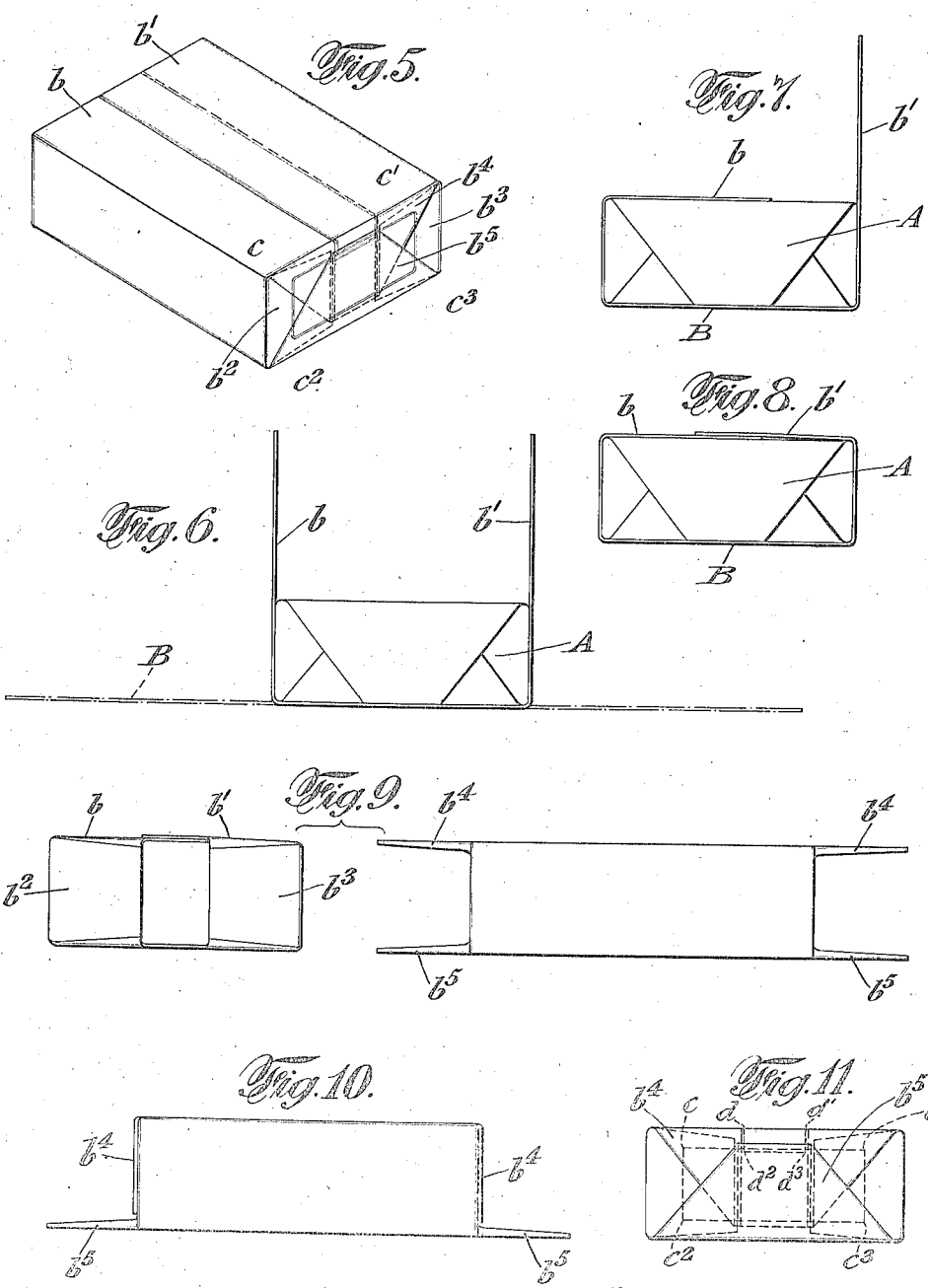

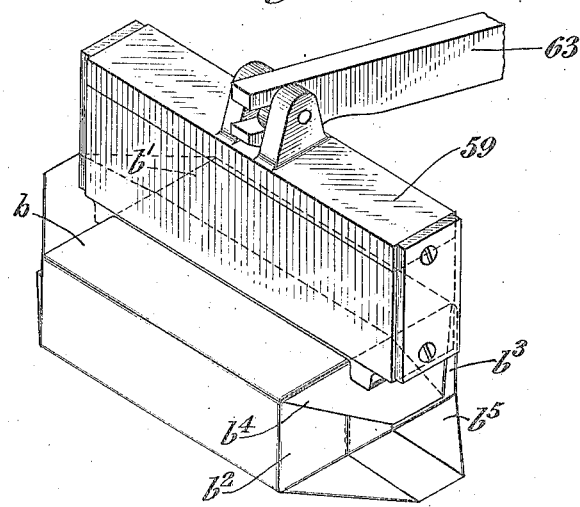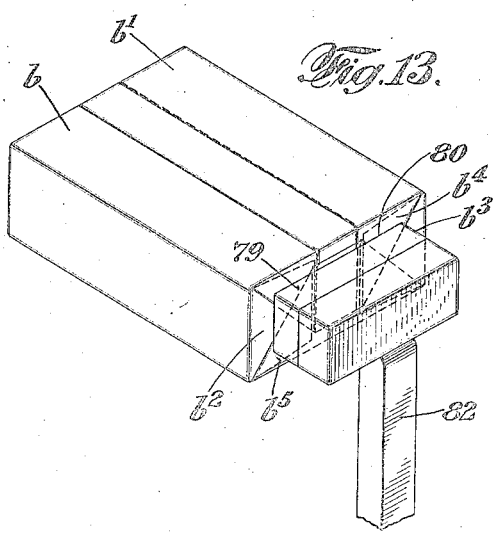

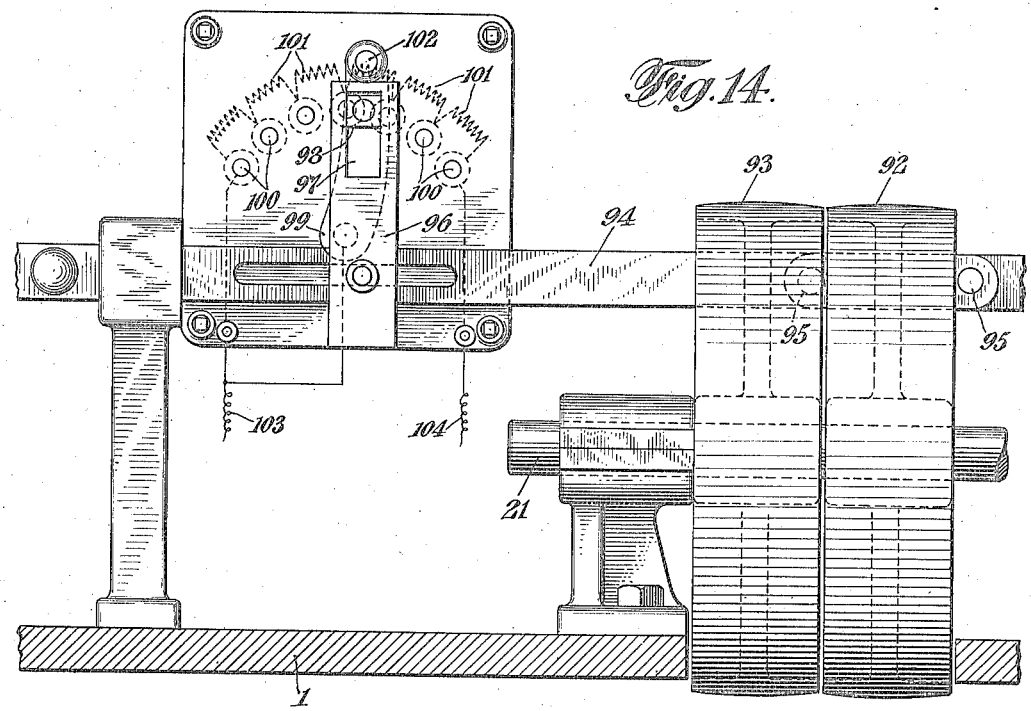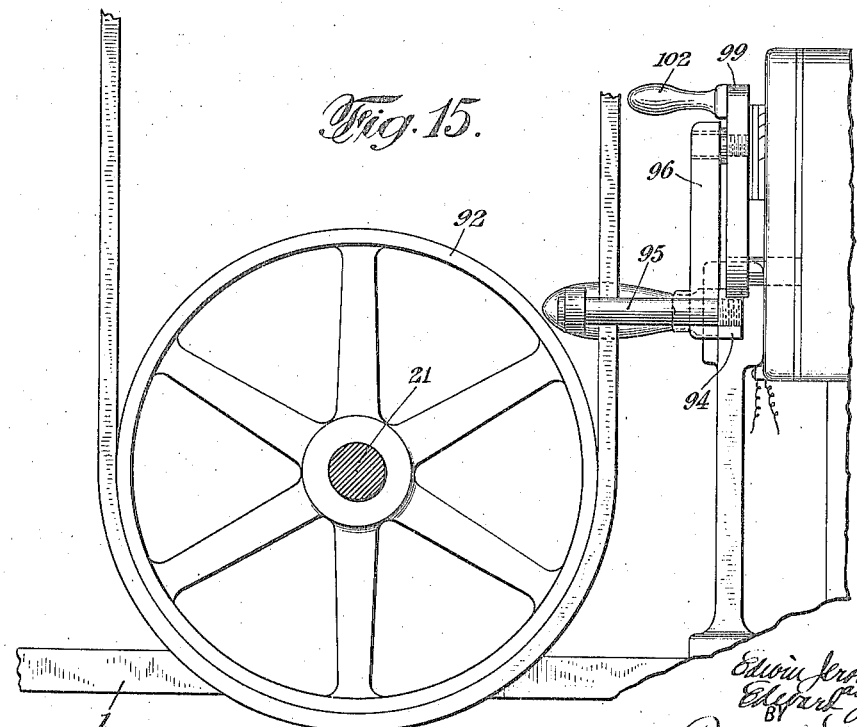

Patented Jan. 23, 1923.

1,443,068

UNITED STATES PATENT OFFICE.

EDWIN JEROME CONLEY, OF NEW YORK, AND EDWARD J. WHALEN, OF HOWARD BEACH, NEW YORK, ASSIGNORS TO THE CONLEY FOIL COMPANY, OF NEW YORK, N. Y., A CORPORATION OF NEW YORK.

MACHINE FOR COVERING PACKAGES WITH FOIL AND SEALING SAID FOIL.

Application filed May 12, 1921. Serial No. 469,069.

*To all whom it may concern:*

Be it known that we, EDWIN JEROME CONLEY, a citizen of the United States, and a resident of New York city, county and State of New York, and EDWARD J. WHALEN, a citizen of the United States, residing at Howard Beach, in the county of Queens and State of New York, have invented a certain new and useful Machine for Covering Packages with Foil and Sealing Said Foil, of which the following is a specification.

The object of our invention has been to provide a machine for covering packages with foil and sealing said foil, which machine shall be capable of hermetically sealing a package with foil and particularly with relatively very thin foil, and to such ends our invention consists in the machine for covering packages with foil and sealing said foil hereinafter specified.

Fig. 1 is a vertical, longitudinal, sectional view of a machine embodying our invention, taken on the line 1—1 of Fig. 4.

Fig. 2 is a transverse, longitudinal, sectional view, taken on the lines 2—2 of Figs. 3 and 4.

Fig. 3 is a side elevation of said machine.

Fig. 4 is a plan view of said machine.

Fig. 5 is a perspective view of a completed cigarette package, which our machine is adapted to form.

Figs. 6, 7, 8, 9, 10, and 11 are views showing the successive steps of folding the foil about a paper-covered package of cigarettes in forming the completed package shown in Fig. 5.

Figs. 12 and 13 are perspective views showing the steps of sealing the foil wrapper to make it hermetic.

Figs. 14 and 15 are, respectively, a side elevation and an end view of parts for automatically regulating the current when the machine is stopped, to prevent over-heating the heating surfaces of the sealing devices.

More particularly, the object of our invention has been to provide a machine which shall be capable of automatically covering a package with foil or similar sheet metal, and of rendering the cover thus formed air and moisture-tight by fusing its parts together, and especially such a machine which will be capable of thus working with foil which is relatively very thin.

Our invention is capable of embodiment in many different forms and our invention is therefore not to be confined to the illustrated embodiment. The machine shown is only to be regarded as typical of many possible embodiments.

We have also chosen to illustrate the operation of the said machine in the formation of a foil-covered package of cigarettes, because the problem of making such a package involves perhaps the maximum difficulties for such a machine, but our invention can be employed in machines for so protecting many kinds of packages.

The steps of folding the foil wrapper about the cigarette package, as practiced by the particular embodiment of our invention, which is shown in the drawings, which steps are shown in Figs. 6 to 11, inclusive, are as follows:

The cigarette package A, which is shown as enclosed in a paper wrapper, is laid upon a flat sheet of foil B, as shown by the dotted line in Fig. 6, and the said sheet is bent upwards along the two sides of the package, as shown in the full lines of said figure. One of the flaps of foil $b$, extending above the package, is then folded down on to the top of the package, as shown in Fig. 7, after which the other flap $b'$ is folded on top of the first flap, as shown in Fig. 8. The smaller end flaps $b^2$ and $b^3$ are then simultaneously folded against the end of the package, as shown in Fig. 9. One $b^4$ of each of the larger pairs of end flaps is then folded down against the end of the cigarette package, as shown in Fig. 10, after which the other $b^5$ of each of the larger pairs of end flaps is folded upon the first one, as shown in Fig. 11. The cigarette package is then in condition for being welded.

The operation of welding flaps $b$ and $b'$ together is shown in Fig. 12 and that of welding the end flaps $b^2$, $b^3$, $b^4$, and $b^5$ together, is shown in Fig. 13.

In the illustrated machine (which is to some extent shown diagrammatically), there is a bed-plate 1, upon which is supported by stationary bearings a spool 2 of sheet foil, the foil preferably passing beneath a guide roll 3 to and upon a table 4, where it is engaged by feed rolls 6—6, which are preferably in intermittent motion. The strip of foil is cut into sheets by a reciprocating knife 7. Before being severed by the knife 7, the sheet of foil is engaged by feed rolls 8, which are preferably constantly running, but are separated each time the knife cuts, so as not to pull and tear the foil while it is held by the knife. These rolls might be operated intermittently and produce the same effect. The rolls 8 feed the severed sheet along the table until it reaches a pair of stops 9, which are separated from each other by a distance greater than the length of the completed package, so that while they will serve to position the foil, they will not obstruct the removal of the completed package. A preferably paper-covered cigarette package 10 is preferably automatically laid upon the sheet of foil upon the table by mechanism not shown, and the paper covering of such package may either be a cardboard carton or the well-known soft variety of paper wrapping. The central portion of the table, upon which the foil rests in the position described, consists, for the moment, of a platen 11, which is shown by dotted lines in an elevated position, the platen being guided in vertical guides 12, formed in frames 13, which rise from the bed-plate, and the platen being supported on the upper end of a bar 14, whose lower end carries a roller 15 that is engaged by the forked end of a lever 16 that is fulcrumed at 17 on a pin supported stationarily from the bed-plate, the opposite end of the lever being pivoted to a vertically slidable bar 18, which carries a roller 19 at its upper end that engages a cam 20, said cam being mounted on a shaft 21 that is journaled in bearings on the bed-plate. The remainder of the portion of the table which supports the sheet of foil in the position described, consists of two leaves, one of which 22, is journaled on a pin or shaft 23 carrying a pinion 24, and said leaf is adapted to be turned upward and over upon the package through an angle of 180 degrees by a vertical rack-bar 25, which is reciprocated by engagement of a lever 26 with a pin 27 on the lower end of the rack-bar, said lever being fulcrumed on a pin 28 on the frame and being actuated through having its rear end pivoted by a pin 28ª to a vertically slidable bar 29, which carries an anti-friction roller at its upper end that is engaged by a cam 30 on the shaft 21. The other of said leaves 31 is similarly journaled upon a pin 32, carrying a pinion 33 that is actuated by a vertical rack-bar 34, the latter being reciprocated by a lever 35, whose rear end carries an anti-friction roller 36, which is engaged by a cam 37 on the shaft 21.

The first step of the machine in folding the wrapper about the cigarette package, which is illustrated in Fig. 6, consists in lowering the platen 11 to the full line position and in simultaneously raising the leaves 22 and 31, which fold the foil about the lower edges and vertical sides of the package, as seen in Fig. 3, and as illustrated in Fig. 6, in then folding one of the leaves, as the leaf 22, over upon the top of the package and swinging it back toward its initial position, and in folding the other leaf 31 also over upon the top of the package as soon as the first leaf has withdrawn out of the path of the second leaf. This brings the package to the condition shown in Fig 8, in which the flaps $b$ and $b'$ overlap each other on the side of the package.

In order to make certain that the package will follow the platen, a plunger 38, in the form of an open-work rectangular frame, is mounted in guides in the frames 13 above the package and is depressed by levers 39 and 40, mounted on a stud shaft 41, the lever 39 being actuated by a cam 42 on a shaft 43 that is connected with the shaft 21 by beveled gears 44. The plunger 38, after engagement with the upper side of the cigarette package, moves in unison with the platen 11, so as to cause the package to follow and keep contact with the platen, and as it must be withdrawn quickly to permit the leaves 22 and 31 to operate, the said plunger is made light and preferably as stated, of skeleton form. The applying of a foil wrapper has, as stated, now reached the stage illustrated in Fig. 8.

In order to fold the small end-flaps $b^2$ and $b^3$ against the ends of the package, the following parts are provided:

Fingers 45 and 46 are, respectively, mounted upon vertical pivots 47 and 48 and adapted to be swung from a position in line with the long vertical sides of the package through 90 degrees into a position against the ends of the package. The finger 46 is actuated by a link 50, which is pivoted to the finger and to a horizontal, slidable bar 51, the latter carrying a roller 52 that is engaged by a cam 53 on the shaft 21. The finger 45 is actuated by a link 54, which is pivoted to a horizontal, slidable bar 55 that is connected with the upper end of a lever 56, which lever turns on a fixed fulcrum, a link 57 being pivoted to the lower end of the said lever at one end and at the other end to the lower end of a lever 58, whose fulcrum is at its upper end and an intermediate portion of which is mounted on the pivot of the roller 52, so that the lever 58 is actuated by the roller 52 to move the finger 46. There is on each side of the machine a pair of fingers 45 and 46 with operating parts such as just described.

The operation of the fingers 45 and 46 in folding the small end flaps $b^2$ and $b^3$ against the ends of the package brings the package to the condition shown in Fig. 9.

It will be observed that on the upper side of the package two end edges, $b$ and $b'$, of the sheet of foil are overlapped. In order to render the package air-tight, it is desired to fuse said overlapped portions together. To do this without destroying the single-thickness portions of the wrapper, a sealing device 59 is provided, which has a heating surface of such shape that it can have surface contact with the said overlapped portions, but cannot touch the single-thickness portions. The device as shown consists of a hollow block having a heating coil 60 within its interior and having an under surface 61 that is adapted to form surface contact with the said overlapped end portions of the sheet of foil.

As it is desired not only to fuse the said overlapped portions together where they lie upon the package, but also to fuse them together for a short distance beyond the package at each end, the surface 61 is so formed that it has downwardly inclined extensions or shoulders 62 at each end to press the overlapped portions of the foil where they extend beyond the package down against the ends of the package, and to fuse them for a short distance across the end of the package.

To fuse said overlapped portions together, it is necessary that the said sealing device, heated to a suitable temperature, depending upon the thickness and nature of the foil and the time of contact of the sealing device with the foil, shall be pressed down upon the foil and held there just long enough to fuse the foil. We find that this can be done successfully and without injuring the parts of the foil where it is of but a single thickness. For instance, a sheet of foil of one-one-thousandth of an inch in thickness can be fused or sealed and without the use of flux or any soldering material by the mechanism described when the surface of the sealing device which contacts with the foil has a temperature of from four hundred to six hundred degrees F. A thermostatic regulator of any suitable known construction may be preferably provided to keep the surface 61 at the proper temperature and neither too hot nor too cold. The sealing device 59 is mounted in guides in the frames 13 and is actuated by a lever 63 that is mounted on a stationary fulcrum on the frame and at its rear end carries an anti-friction roller 64 that is engaged by a cam 65 that is mounted on the shaft 21.

The sealing device 59 advances to the package as soon as the leaf 31 is sufficiently out of the way, and the sealing device is pressed against the package contacting only with the overlapping edges or flaps $b$ and $b'$ where they overlap and are consequently of double thickness, and not contacting with the foil where it is of only a single thickness. The cam 65 is so shaped and rotated as to give the sealing device 59 contact with the foil for just the proper time to accomplish the fusing without injuring the foil. This fuses the said overlapped flaps together, so that the joint is air and moisture tight, and, as stated, the result may be accomplished without the use of flux or any soldering material.

The mechanism for folding the large end flaps $b^4$ and $b^5$ against the ends of the package consists of fingers 66 and 67, which are pivoted in a slide 68 that is mounted in guides on the bed-plate 1, the said fingers having pinions 69 and 70, respectively, on and rotatable with said fingers on said pivots.

The pinion 69 of the upper finger 66 is engaged by a rack bar 71 that is mounted in the said slide 68 said rack bar carrying an anti-friction wheel 72 that is engaged by a cam 73 on the shaft 43 before referred to. The pinion 70 of the lower finger 67 is engaged by a similar rack bar 74 that is similarly mounted in said slide and is similarly operated by a cam 75 on the said shaft 43. The working movements of the fingers are effected by the action of springs (not shown) in forcing the anti-friction rollers of the rack bars into depressions in the cams. The slide 68 has an arm 76 rigidly connected therewith, which carries an anti-friction roller 77 that bears against a cam 78, which gives motion to the said slide.

In the operation of the fingers 66 and 67, the slide 68 is advanced toward the package so soon as the sealing device 59 has sufficiently withdrawn to prevent interference, and the upper finger 66 engages and folds down the upper large end flap $b^4$ of foil: the said finger then retreats, and the lower finger 67 engages the lower large end flap $b^5$ of foil and folds it over the flap $b^2$. Similar mechanisms are provided on the opposite side of the machine for folding the flaps $b^2$, $b^3$, $b^4$ and $b^5$ on the opposite end of the package. This brings the foil covering to the condition shown in Fig. 11.

The slide 68 having been retracted so as to carry the fingers 66 and 67 out of the way, a sealing device is brought into play for sealing the said four overlapping flaps $b$, $b'$, $b^2$ and $b^3$ on each end of the package. The said end-sealing device consists of an element in the form of a block 79 having a heating surface 80 that, as indicated by the dotted rectangle $c$, $c'$, $c^2$ and $c^3$, in Fig. 11, is large enough to overlie all of the said end flaps, and yet is not large enough to extend over any single-thickness portions of the foil. The said surface 80 is also large enough to slightly overlie the sealing or fusing accomplishment by the shoulders 62, which in Fig. 11 is indicated by the dotted rectangle $d$, $d'$, $d^2$ and $d^3$, so that there will be no overlapping portions of the foil that are not made air-tight.

The end sealing device is shown as having within it an electric heating element 81, and it may have a thermostatic regulator to keep the surface 80 at the proper temperature. The sealing device 79 is mounted on the upper end of a vertical bar 82 that is mounted in a guide-way in a slide 83, which latter is mounted on the bed-plate. The bar 82 is given vertical movement by a lever 84 fulcrumed at 85 on a standard on the bed-plate, the opposite end of the lever being pivoted to the lower end of a vertically movable bar 86 that is depressed at proper times by a cam 87.

In all instances in the illustrated machine, where slides, bars or levers are operated by cams, springs or other devices for holding the said elements against the said cams are to be understood, although, for simplicity, they are not shown.

The mechanism just described raises the sealing device 79 to the proper level to engage the end flaps on the package. In order to press the surface 80 against said flaps when said surface is at the upper level, the slide 83 is connected by a link 88 with one arm 89 of a right-angle lever, whose opposite arm 90 carries a roller that engages a cam 91 on the said shaft 43, the cam being properly shaped and timed, so that a spring (not shown), acting to force the anti-friction roll of the lever-arm 90 against its cam will, under the control of the cam, give the surface 80 the proper pressure for such a length of time as to accomplish an effective sealing without injuring the foil.

A sealing device similar to the sealing device 79 is mounted on the opposite side of the machine, so that both ends of the package are sealed simultaneously.

When the machine is in constant operation, more heat is required to keep the heating surfaces at the desired temperature than when the machine is at rest, because of the repeated contacts of those surfaces with the metal foil. Therefore, if the values of the electric current should remain constant during operating and rest periods, the temperature of the heating surface would rise during the period of rest to a degree that would, upon resumption of operation of the machine, cause the metal wrapper to be melted instead of sealed. We have therefore provided the devices which are shown in Figs. 14 and 15.

Upon a shaft, such as the shaft 21, are mounted a loose pulley 92 and a tight pulley 93. A belt-shifter is provided consisting of a horizontally slidable bar 94 carrying pins 95 which embrace the belt. The said bar carries a plate 96 having a vertical slot 97 that engages a block 98 which is pivoted on the lever 99 of a rheostat comprising contact points 100 having resistance coils 101 therebetween. The lever 99 carries a handle 102. When the machine is stopped, the bar 94 must be shifted to throw the belt from the tight pulley to the loose pulley, and the rheostat is so arranged that such movement of the said bar throws the lever 99 into contact with that point 100 which will throw into the circuit leading to and from the heating surfaces from the leads 103 and 104 the proper number of resistance coils 101 to keep the current down to a value that will maintain the heating surfaces of the sealing devices at the proper temperature when they are not being cooled by the frequent contacts with the foil. When, however, the machine is started up again by moving the bar 94 so as to shift the belt from the loose to the tight pulley, the lever 99 of the rheostat is thereby thrown to a contact point which cuts out some or all of the resistance coils 101, thus allowing a greater amount of current to flow to maintain the said heating surfaces at the desired temperature notwithstanding their giving up heat by repeatedly fusing and sealing the foil. There are many types of rheostat which might be used.

The sealing of the package having been completed it is removed from the machine and the operation repeated.

To briefly state the complete operation of our machine, the separate steps of which operation have been more fully stated in connection with the description of each group of elements:

A sheet of foil of the proper length to form a wrapper is first cut from the strip leading from the spool 2 by the knife 7 and is fed over the table (composed of the leaves 22 and 31 and of the platen 11 in its upper or dotted-line position) until the sheet of foil strikes the stops 9. The package 10 of cigarettes, wrapped in paper or similar material, is then laid upon the sheet of foil over the platen 11; the plunger 38 is depressed to engage the upper surface of the package and hold it down upon the platen while the latter is retracted to the lower full-line position. This operation, with the aid of the leaves 22 and 31, causes the wrapper to be folded against the vertical sides of the package. When the package has reached its lower position, in which its upper surface is on a level with the under side of the leaves 22 and 31, the leaf 22 is folded over upon the package to bend the end $b$ down upon the top of the package and as soon as the said leaf has retreated sufficiently, the leaf 31 folds the opposite end flap $b'$ down upon the first mentioned flap, so that they overlap a sufficient distance to permit their being effectively welded together. The fingers 45 and 46 then fold the small end flaps $b^2$ and $b^3$ against the ends of the package bringing the package to the condition shown in Fig. 9.

Simultaneously with the action of the fingers 45 and 46 in folding the small end flaps, or slightly later than their movement, the sealing device 59 is caused to fuse the top flaps $b$ and $b'$ along the top of the package and also, through the operation of the shoulders 62, preferably somewhat beyond the ends of the package, so as to meet or enter the area later to be fused by the end-sealing device 65. The finger 66 then folds the upper large end-flap $b^4$ down against the package, and the finger 67 folds the lower large end-flap $b^5$ up against the package, thus bringing the package into the condition shown in Fig. 11.

The fingers 66 and 67 then being retracted, the end-sealing device 79 is raised to the level of the ends of the package and pressed against the overlapped flaps thereon, fusing them together, the heating face 80 of the sealing device 79 being, as stated, smaller than the end of the package, so as only to engage the double portions of the foil which are formed by the overlapping, and not to touch any portion of the foil where it is of but a single thickness, said heating face overlapping the area welded by the shoulders 62, so that there is no point along the whole line of the meeting edges of the sheet of foil where the fusing is not complete. The package is now complete.

The platen 11 is then raised to its initial position, in which it is flush with leaves 22 and 31, and it thus carries the package up to the level of the table, ready to be removed from the machine in a direction to the right, as shown in Fig. 3. The machine is now ready to begin work on a new package.

When the machine is stopped, the rheostat is automatically operated to cut down the current, so as not to overheat the operating surfaces of the sealing devices, but to maintain them only at working temperature, so that when the machine is started again, the foil will be fused merely, not burned.

Our machine has the following advantages:

The package made by it can be made of sufficiently thin foil and at a low enough cost so that it can be sold to advantage.

Our machine can operate upon foil so light as not to add materially to the cost of transportation of the package.

Although the packages operated upon may be relatively soft and yielding, such as a cigarrett package, yet our machine can successfully seal the metal foil envelope, even though the foil be relatively very thin; for instance, below three one-thousandths of an inch.

Our machine will successfully seal foil as thin as one one-thousandth of an inch in thickness.

A package sealed by our machine will be air and moisture tight, so that, for instance, the flavoring of tobacco cannot escape, nor can moisture or fumes penetrate the package from without.

As our machine in its preferred form operates upon the package, and especially seals the same in a stationary position and does not cause any substantial relative sliding motion between the foil and the heating and folding parts, substantially all tendency to tear the foil is thereby avoided. Even though such parts be made very smooth, there is a tendency for the material of the foil to gradually accumulate upon the surfaces and to roughen them so that in later operations they would tear the foil.

The term "surface contact" is meant to distinguish from a line contact, such as contact from a relatively small cylinder, or a point contact such as a contact from a relatively small surface which is curved in all directions.

I claim:

1. A machine for fusing a foil envelope upon a package, comprising means for holding the package, a heating device suitable for sealing or fusing the foil and means for bringing said package and said heating device into relative contact.

2. A machine for fusing a foil envelope upon a package, comprising means for holding the package, a heating device suitable for sealing or fusing the foil and means for bringing said package and said heating device into contact by a relative motion substantially perpendicular to the portion of the foil being sealed.

3. A machine for fusing a foil envelope upon a package, comprising means for holding the package, a sealing device, having a surface which is substantially the same as a portion of the envelope which it is to seal, means for heating said surface to a suitable temperature for sealing the foil, and means for bringing said heating device and the package into contact.

4. A machine for fusing a foil envelope upon a package, comprising means for holding the package, a sealing device, having a surface which is substantially the same as a portion of the envelope which it is to seal, means for heating said surface to a suitable temperature for sealing the foil, and means for bringing said heating device and the package into contact by a movement substantially perpendicular to the portion of the foil to be sealed.

5. A machine for sealing foil-covered packages, comprising means for holding a foil-covered package, a sealing device, having a surface substantially conforming to the contour of the portion of the foil covering to be sealed, said surface being not larger than the overlapped portions of foil to be sealed together, means for heating said surface to a suitable temperature for fusing and sealing the foil, and means for bringing said heating device and foil into contact with each other.

6. A device for sealing foil-covered packages, said device having a surface of the contour of the portion of foil to be sealed and said surface being large enough so that said device can operate by a single application to the foil by a movement substantially perpendicular to the portion of the foil to be sealed.

7. A device for sealing foil-covered packages, said device having a surface of the contour portion of the foil to be sealed, said device being adapted or fusing the portion of the foil desired to be treated by application to the foil by a relative movement toward the foil but substantially without movement along the foil.

8. A device for sealing foil-covered packages, said device having a surface of the contour of the portion of foil to be sealed and said surface being large enough so that said device can operate by a single application to a considerable portion of the foil by a movement substantially perpendicular to the portion of the foil to be sealed.

9. A machine for wrapping and fusing a foil envelope upon a package, comprising means for wrapping such envelope about the package, a heating device, suitable for sealing or fusing the foil, and means for bringing said package and said heating device into relative contact.

10. A machine for fusing a foil envelope upon a package, comprising means for holding the package, a heating device, suitable for sealing or fusing the foil and of such shape as to be capable of surface contact with the overlapped portions of the foil, while not having contact with other portions thereof, and means for bringing said package and said heating device into relative contact.

11. A machine for fusing a foil envelope upon a package, comprising means for holding the package, a heating device suitable for sealing or fusing the foil and adapted to have surface contact with overlapped portions of the foil, while not having contact with other portions thereof, and means for bringing said package and said heating device into contact by a relative motion substantially perpendicular to the portion of the foil being sealed.

12. A machine for folding and fusing a foil envelope upon a package, comprising means for so folding foil about the package that its edges shall overlap a sealing device which is adapted to have surface contact with an overlapped portion of the foil, while not having contact with other portions thereof, means for heating the operative surface of said sealing device to a suitable temperature for sealing the foil, and means for bringing said heating device and the package into contact.

13. A machine for wrapping and fusing a foil envelope upon a package, comprising parts adapted to fold the foil upon the package by movement substantially perpendicular to the surface of the foil and without relative movement along the surface of the foil, and means for fusing the overlapped portions of the foil.

14. A machine for wrapping and fusing a foil envelope upon a package, comprising parts adapted to fold the flaps of foil upon the package by movement substantially perpendicular to the surface of the foil and without relative movement along the surface of the foil, and means for fusing the overlapped portions of the foil, said means for fusing comprising a heated part adapted to have surface contact with said overlapped portions, and means for bringing said surface and said overlapped portions of the foil into contact by a movement substantially perpendicular to the foil.

15. A machine for folding foil about a package, comprising a table adapted to support a sheet of foil and a package thereupon, the portion of said table beneath said package constituting a platen that is movable substantially perpendicularly to said table and a follower adapted to maintain said package and foil in contact with said platen during said movement, said table comprising leaves movable about axes substantially coincident with the edges of the opening occupied by the platen and adapted to fold the free edges of the foil down upon the package.

16. A machine for folding foil about a package, comprising a table adapted to support a sheet of foil and a package thereupon, the portion of said table beneath said package constituting a platen that is movable substantially perpendicularly to said table, and a follower adapted to maintain said package and foil in contact with said platen during said movement, said table comprising leaves movable about axes substantially coincident with the edges of the opening occupied by the platen and adapted to fold the free edges of the foil down upon the package, and fingers movable upon axes substantially coincident with edges of said package that are perpendicular to said platen, said fingers being adapted to fold the flaps of said foil against the package.

17. A machine for folding foil about a package, comprising a table adapted to support a sheet of foil and a package thereupon, the portion of said table beneath said package constituting a platen that is movable substantially perpendicularly to said table, and a follower adapted to maintain said package and foil in contact with said platen during said movement, said table comprising leaves movable about axes substantially coincident with the edges of the opening occupied by the platen and adapted to fold the free edges of the foil down upon the package, fingers movable upon axes substantially coincident with edges of said packages that are perpendicular to said platen, said fingers being adapted to fold the flaps of said foil against the package, and fingers adapted to fold the remaining flaps against the ends of the package.

18. A machine for folding foil about a package and for fusing the same, comprising means for folding a sheet of foil about a package and overlapping its end edges flat upon the package, and forming the side edges into overlapped flaps upon the ends of the package, and a fusing device adapted to have surface contact with said overlapping edges.

19. A machine for folding foil about a package and for fusing the same, comprising means for folding a sheet of foil about a package and overlapping its end edges flat upon the package and forming the side edges into overlapped flaps upon the ends of the package, and a fusing device adapted to have surface contact with said overlapping end edges, both upon the sides of the package and the ends thereof.

20. A machine for folding foil about a package and for fusing the same, comprising means for folding a sheet of foil about a package and overlapping its end edges flat upon the package, and forming the side edges into overlapped flaps upon the ends of the package, a fusing device adapted to have surface contact with said overlapping end edges, both upon the sides of the package and the ends thereof, and a fusing device adapted to have surface contact with the overlapping flaps on the ends of the package.

21. A machine for folding foil about a package and for fusing the same comprising means for folding a sheet foil about a package and overlapping its end edges flat upon the package and forming the side edges into overlapped flaps upon the ends of the package, a fusing device adapted to have surface contact with said overlapping end edges, both upon the sides of the package and the ends thereof, and a fusing device adapted to have surface contact with the overlapping flaps on the ends of the package, said fusing devices being not larger than the overlapping portions of the foil with which they are adapted to contact.

22. A machine for folding foil about a package and for fusing the same, comprising means for folding a sheet of foil about a package and overlapping its end edges flat upon the package, and forming the side edges into overlapped flaps upon the ends of the package, a fusing device adapted to have surface contact with said overlapping end edges, both upon the sides of the package and the ends thereof, and a fusing device adapted to have surface contact with the overlapping flaps on the ends of the package, said fusing devices being not larger than the overlapping portions of the foil with which they are adapted to contact, said side and end fusing devices being so proportioned that their operative areas shall overlap.

23. A machine for fusing a foil envelope upon a package, comprising means for holding the package, a heating device suitable for fusing the foil, means for maintaining said heating device at a temperature suitable for sealing or fusing the foil, and means for bringing said package and said heating device into relative contact.

24. A machine for fusing a foil envelope upon a package, comprising means for holding the package, a heating device suitable for fusing the foil, means for maintaining said heating device at a temperature suitable for sealing or fusing the foil, means for bringing said package and said heating device into relative contact, and means for decreasing the supply of heat when said machine is stopped.

25. A machine for fusing a foil envelope upon a package, comprising means for holding the package, a heating device suitable for fusing the foil, means for maintaining said heating device at a temperature suitable for sealing or fusing the foil, means for bringing said package and said heating device into relative contact, and automatic means for decreasing the supply of heat when said machine is stopped.

26. A machine for fusing a foil envelope upon a package, comprising means for holding the package, a heating device suitable for sealing or fusing the foil, means for maintaining said heating device at a temperature suitable for sealing or fusing the foil, means for bringing said package and said heating device into relative contact, and automatic means for decreasing the supply of heat when said machine is stopped and for increasing the supply of heat when the machine is started.

27. A machine comprising means for feeding a sheet across a table, stops adapted to position said sheet, and means for wrapping said sheet about a package, said stops being wider apart than the wrapper when wrapped about said package.

28. A machine for fusing a foil envelope upon a package comprising means for folding the envelope about the package and means, separate from the folding means, for fusing each joint that is fused on said package.

29. A machine for fusing a foil envelope upon a package comprising means for folding the envelope about the package and means, separate from the folding means, for fusing each joint that is fused on said package, each of said fusing means being adapted to have substantially surface contact with the parts to be fused.

30. A device for sealing foil-covered packages, said device being adapted to have substantially surface contact with the joint to be fused.

31. A machine for fusing a foil envelope upon a package comprising means for holding the package, means for folding the foil about the package and means for fusing all of the joints of the package to hermetically seal it.

32. A machine for fusing a foil envelope upon a package comprising means for holding the package and means for automatically fusing all of the joints of the package to hermetically seal it.

33. A machine for fusing a foil envelope upon a package, which envelope has a plurality of joints, comprising means for holding the package and means for fusing all of said plurality of joints of the package to hermetically seal it.

34. A machine for fusing a foil envelope upon a package, which envelope has a plurality of joints, comprising means for holding the package and means for automatically fusing all of said plurality of joints of the package to hermetically seal it.

In testimony that we claim the foregoing we have hereunto set our hands this 9th day of May, 1921.

EDWIN JEROME CONLEY,
EDWARD J. WHALEN.